United States Patent [19]
Speed

[11] Patent Number: 5,592,593
[45] Date of Patent: Jan. 7, 1997

[54] PRINTING IN DATA PROCESSING SYSTEMS

[75] Inventor: Robin C. Speed, Winchester, England

[73] Assignee: International Business Machines Corporation, Armonk, N.Y.

[21] Appl. No.: 217,227

[22] Filed: Mar. 24, 1994

Related U.S. Application Data

[63] Continuation of Ser. No. 875,877, Apr. 30, 1992, abandoned.

[30] Foreign Application Priority Data

Apr. 30, 1991 [EP] European Pat. Off. .............. 91303919

[51] Int. Cl.⁶ ...................................................... G06K 15/00
[52] U.S. Cl. ............................................. 395/110; 395/114
[58] Field of Search ..................................... 395/110, 112, 395/115, 116, 114, 150–154; 400/62, 67, 69, 76

[56] References Cited

U.S. PATENT DOCUMENTS

| | | | |
|---|---|---|---|
| 4,594,674 | 6/1986 | Boulia et al. | 395/151 |
| 4,745,561 | 5/1988 | Hirosawa et al. | 395/151 |
| 5,051,925 | 9/1991 | Kadono et al. | 395/110 |
| 5,093,903 | 3/1992 | Sudoh et al. | 395/110 |
| 5,313,565 | 5/1994 | Mori | 395/110 |

*Primary Examiner*—Arthur G. Evans
*Attorney, Agent, or Firm*—Michael E. Belk

[57] ABSTRACT

Fonts for use in printing documents are dynamically generated as they are required for printing. Preferably only those characters from the font which have been used in the document are dynamically generated in bitmap form and sent to the printer prior to data for identifying and positioning the characters on the page. The dynamically generated bitmaps may be retained by the printer for use in printing subsequent pages and documents. Less data per page needs to be sent to the printer and the sending of full-page bitmaps may be avoided.

19 Claims, 4 Drawing Sheets

PRINTING IN DATA PROCESSING SYSTEMS

The application is a continuation, of application Ser. No. 07/875,877, filed Apr. 30, 1992, now abandoned.

BACKGROUND OF THE INVENTION

The present invention relates to the printing of documents stored in a data processing system. More specifically, the present invention relates to systems in which different fonts or founts may be specified for printing.

In the past documents created and stored in data processing systems, such as computers and word processors, were limited in their appearance by the small number of fonts, i.e., the character sets, of a given size and style which were available at the printer.

With daisywheel and golfball printers, the choice of fonts is dependent on which particular detachable cartridge is attached to the printer because the font is pre-formed on the cartridge. This has rendered the printing of graphical data on such printers extremely difficult. With ink-jet printers, thermal printers, laser printers and dot matrix printers, a choice of fonts is normally available in the printer without having to make physical changes. These fonts are called printer fonts or device fonts and are usually held in ROM cartridges or on disk within the printer. Such printers usually also allow new fonts to be transmitted to them which they then store in RAM. These transmitted fonts are commonly known as soft fonts.

System fonts are fonts which are held in the operating system of a computer system and are used to display documents on the display device of the computer system. These fonts may be scalable which means that the size of the font characters may be varied. The introduction of scalable system fonts has meant an increase in the number of different fonts available to the user. These fonts can be used both on the user's display terminal and on the printer even though they have different resolutions and so gives the user better WYSIWYG (what you see is what you get). A drawback of system fonts is that printing is significantly slower than printing using fonts already in the printer. This is because in known systems, the way in which a page of a job or document is printed is that graphical data representing the system font characters is collected in a large bitmap inside the computer system. When all the data for the given page has been processed, the bitmap representing the page is analyzed for rectangles containing non-0 bits (i.e. bits that will print black on he printer) and these rectangles are sent to the printer as bitmaps. Solid black rectangular areas can often be sent by special rectangle-fill commands to the printer. For a full page of text, this bitmap can often be between half a megabyte and a megabyte of data. In contrast, characters drawn using fonts in the printer are sent directly and efficiently as characters to the printer. Some printers also contain scalable fonts and can have scalable fonts transmitted to them. However, even in this case the format used by the printer may be incompatible with that used for the scalable fonts in the computer system and it is almost always the case that an algorithm for translating one format into the other is not available. This makes it difficult to use the same fonts for printing and displaying the same document.

Soft fonts, which are pre-assembled and non-scalable, have been used to increase the fonts available in printers. The range of sizes available for scalable fonts means that it is impractical to have pre-assembled fonts of all possibly required sizes residing permanently either on the computer system or in the printer.

Using fonts stored in the printer has the disadvantage that effects achievable by the computer system such as partially visible characters, i.e., clipped characters, and shaded character, i.e., characters which are to be shown in white on the printed document, may not be achievable by sending commands to the printer.

Viewed from one aspect, the invention provides a method of printing a document stored in a data processing system comprising the steps of:

selecting a document to be printed on a printer linked to said data processing system;

selecting a specified system font for use in printing at least part of said document;

generating character definition data representing said specified system font;

converting said generated character definition data to a format acceptable to said printer as soft font definition data;

transmitting said soft font definition data to said printer; and transmitting character identification data to said printer for printing said document using said soft font definition data.

An advantage of printing documents using this method is that less data per page needs to be transmitted to the printer since the sending of full-page bitmaps may be avoided and accordingly printing speed is increased. In addition, systems which store the data to be transmitted on disk, a technique known as spooling, need less storage to store that data. Also, printers without enough RAM to store a full page bitmap may now be able to print such documents. It is surprising that introducing the additional overhead of dynamically downloading fonts to the printer actually produces an overall performance improvement and reduction in the amount of data to be transmitted to the printer.

This is apparent when it is considered that most documents in a word processing environment contain fewer than about 10 fonts. The actual number of distinct characters used in most western language fonts is usually not more than seventy. On a printer which prints three hundred dots per inch, most fonts are around fifty pixels high and wide. Thus sending all the fonts necessary to the printer and then sending the data necessary to position and print each character is at most:

(70 charact.×10 fonts×50 pixels×50pixels)/8 bits=218,750 bytes for downloading all the fonts required for a document. Assuming that it takes at most 11 bytes to position and print each character and that there are 4,000 characters on each page of the document to be printed, this means that at most 262,750 bytes are required for printing the first page and at most 44,000 bytes for each subsequent page. Experimentation has shown these to be very conservative estimates.

This is a significant saving on the prior art method of printing wherein between one half and one megabyte of data is often required to print each page of a document.

The speed of transmission to the printer is in many cases only around 9,600 bytes per second. The transmission time is usually large in comparison to any processing that needs to be carried out, and so the time taken to generate the soft font definition data can be effectively ignored. In addition, the prior art methods also required processing to produce the full-page bitmaps.

SUMMARY OF THE INVENTION

In accordance with a preferred feature of the present invention, the transmitted font data is retained in the printer for use in printing any subsequent documents specifying the same font. This saves time if the same font is reused.

In accordance with a further preferred feature of the present invention, only character definition data for those characters actually included in the document to be printed are transmitted to the printer when the printer allows such flexibility. This reduces the overhead incurred by transmitting unused character definitions.

In order that the invention may be fully understood, preferred embodiments thereof will now be described, by way of example only, with reference to the accompanying drawings in which:

DESCRIPTION OF THE PREFERRED EMBODIMENT

Figure 1A:
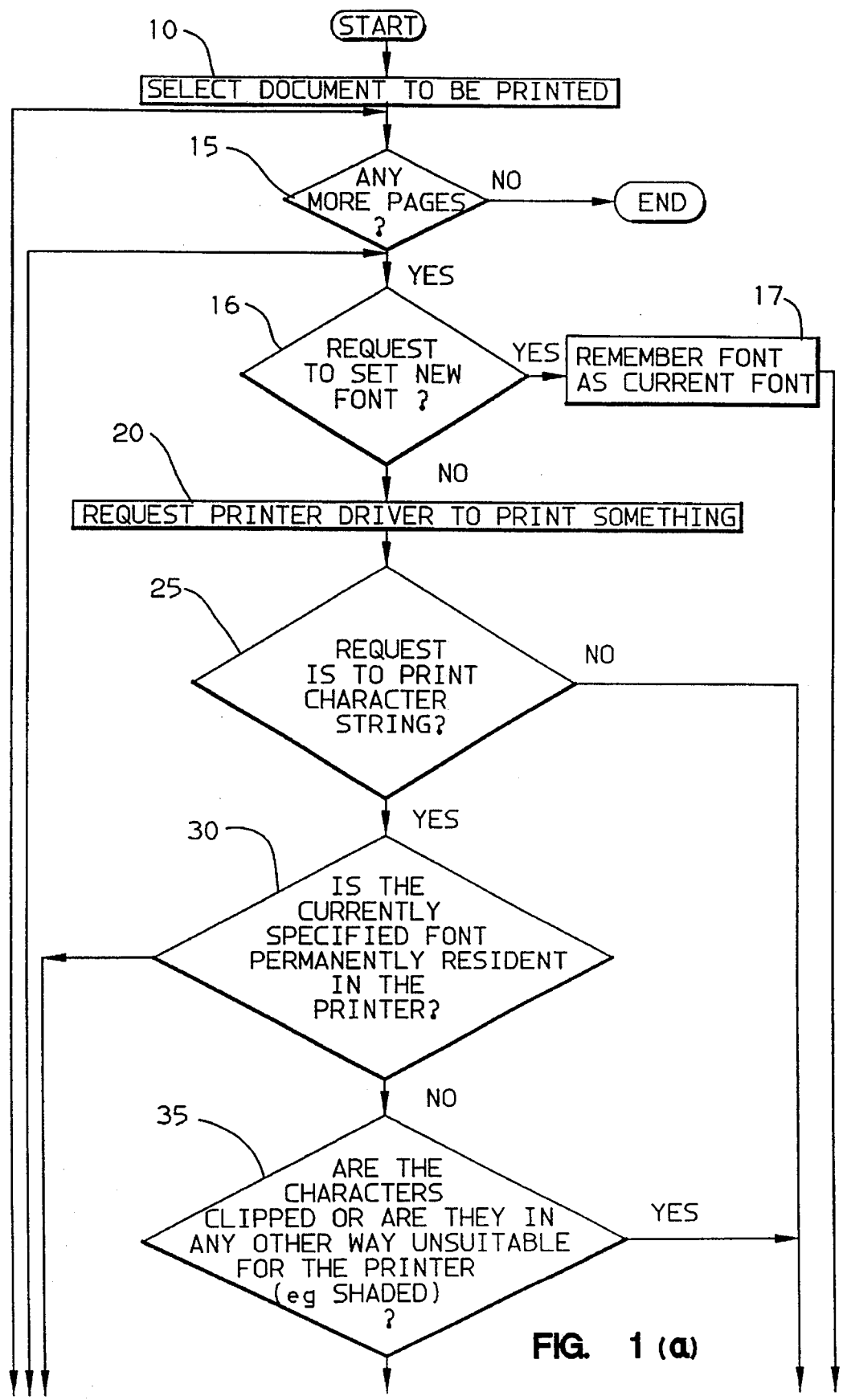
FIGS. 1a–1c comprise a flowchart showing the steps taken by a computer system when printing.
Figure 1:
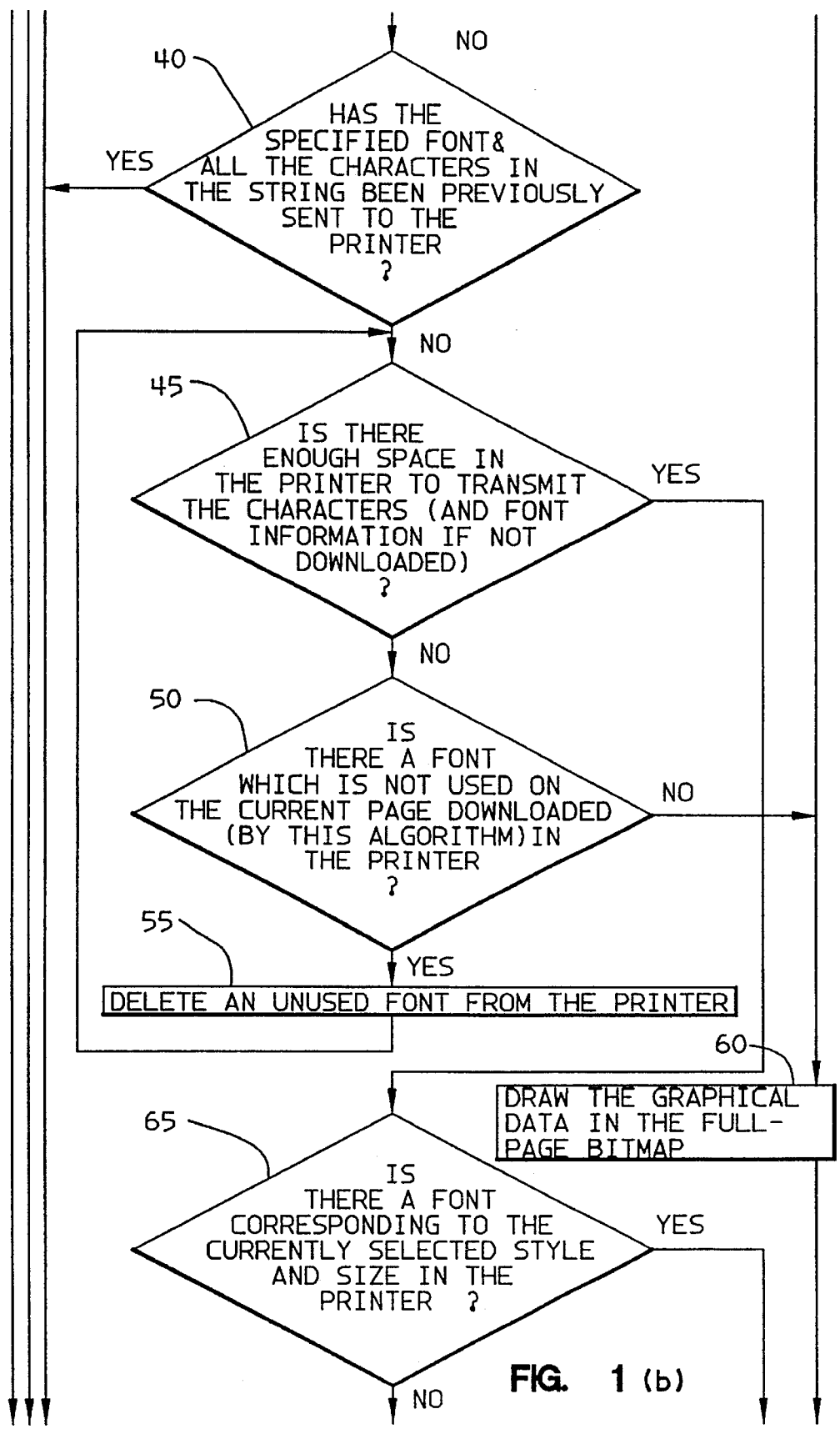
Figure 1:
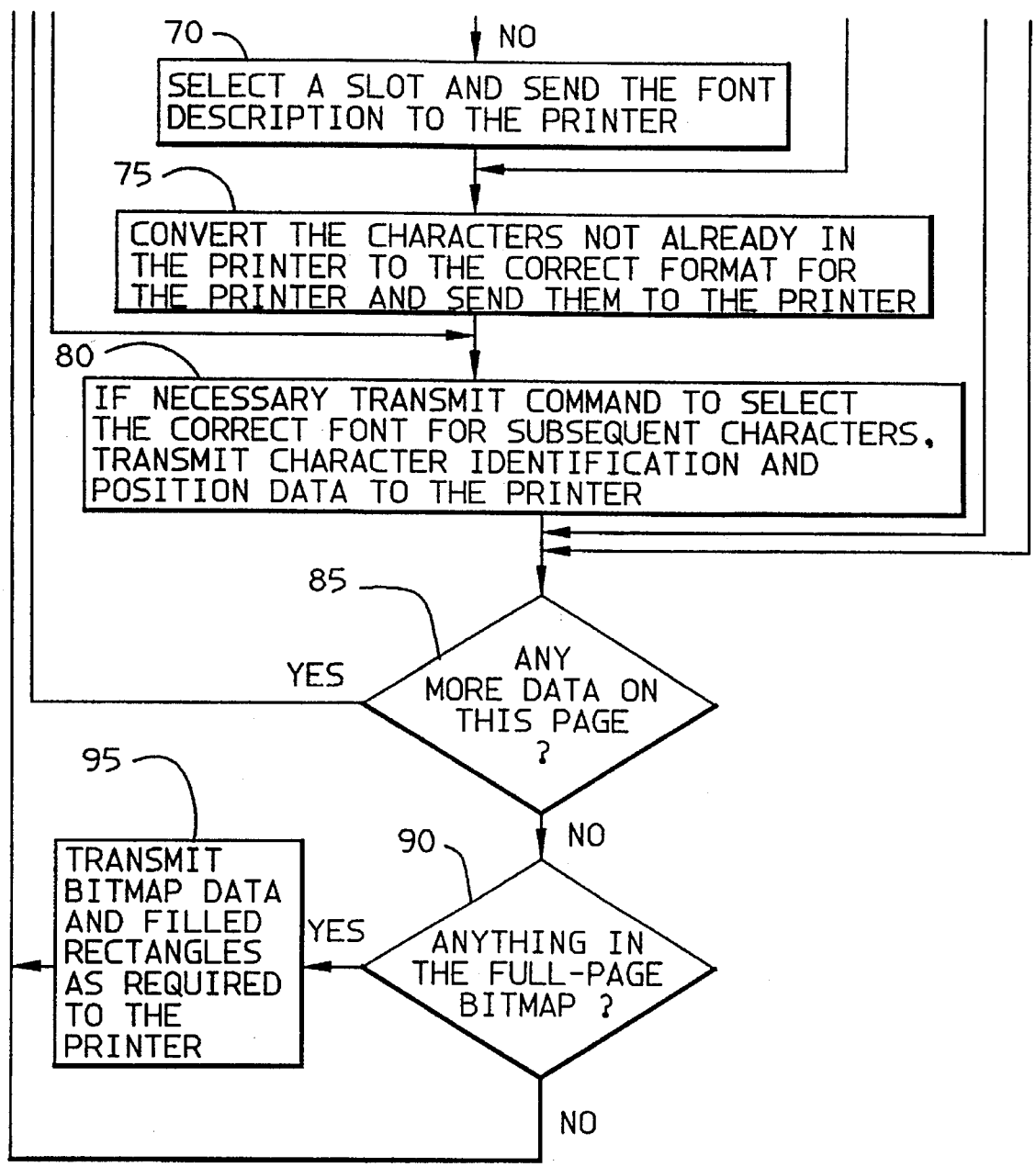

Referring to FIGS. 1a–1c, a flow chart shows the steps taken by the computer system when printing a document in accordance with the preferred embodiment of the invention. The printing process starts at 10 where a document stored in the computer is selected by the computer operator for printing. At step 16, a page of the document is analyzed for any instructions to change font. A signal is then sent to the printer driver specifying that a particular system font instance, i.e., a particular font face drawn at a particular size and orientation, is to be used in printing subsequent characters sent to the printer driver. Any new font then becomes the current font at 17. The computer programs may choose to use fonts installed in the printer—usually cartridge fonts, fonts in read-only memory or soft fonts. All these are regarded as permanently resident in the printer. System fonts may also be chosen. The printer driver may now receive a signal to print something as shown in box 20 of FIG. 1. If characters are to be drawn, box 25, a check is made to see if the font instance selected is for a font permanently resident in the printer at 30. If such a device font is selected, the character identification and position data are transmitted to the printer at 80.

If the specified font is not a device font, then the printer driver software checks at 35 to see if the special effects not available on the printer such as partially visible or shaded characters are required. If so, the characters are drawn in the full page bitmap as in the prior art at 60. If not, a check is made at 40 to see if the specified font is a system font instance which has been previously downloaded from the computer system to the printer and is available in the printer's memory. The check at 40 also checks to see if all the characters requested have been sent to the printer.

The printer driver software assumes that a fixed maximum number of soft fonts can potentially be created on the printer. A simple implementation involves assigning one printer soft font, hereinafter called a slot, to each system font instance. The printer concerned here supports soft fonts which are non-scalable and defined in terms of the pixels within each character. This means that it is simple for software to create character data for new characters in the format required by the printer. Commands sent to the printer define the size to be used for a given slot. This size remains fixed until the font definition is deleted from the slot by a command from the computer system. Clearly, slots and characters within slots could be allocated in other ways but the implementation here does not use this potential convenience.

The printer driver software keeps a record of which characters for a given font instance have corresponding printer character bitmaps and which slot they are assigned to.

If the specified font is not available in the printer, then a check is made at 45 to see if a new slot can be used in the printer without exceeding printer memory requirements. Also, if extra characters must be downloaded to the slot, a check may be made to see if there is sufficient space remaining in the printer to store the new definitions. In either case, if another slot is require which would exceed the limit or if there is not enough room for the new characters, the printer driver software consults its data to see if there is a font downloaded to the printer which has not yet been used on the current page, see FIG. 1, box 50. If such a font is found, then it is deleted from the printer, and the printer driver updates its tables and retries the test at 45. If such a font is not found, the character string is drawn into the full page bitmap at 60. If the required slot is not present on the printer, it is created by sending information to the printer at 70. In a preferred embodiment, only those characters which actually appear in the document are downloaded. Bitmaps of the required characters are converted from the format used by the computer system at 75 into a format which is acceptable to the printer. This may involve re-ordering either bits or bytes and either adding or removing padding bits or bytes. The bitmap is reduced by removing any blank space either above or below or to left or right if the printer allows this. These converted bitmaps are then sent at 75 to the allocated slot in the printer.

As shown in box 80, if necessary, commands are sent to the printer to select the correct slot or font for subsequent characters sent to the printer. Character position and identification data is then sent to the printer to enable printing of the document.

Going back now to box 40, if the specified font data is available in a slot in the printer and if this font data includes all the characters contained in the character string request then as shown in 80, character identification and position data is sent to the printer preceded if necessary by slot selection data. This is expected to be the most common flow. It is not necessary to have printer character bitmaps for every possible character code in a font stored in the printer, only those which are used on the page being printed at the time. If the model of printer being used requires that an entire font be present, then it is still effective to download all the characters required for a given document to a given slot and blank, and therefore compressed, characters for the rest. The slot may contain extra bitmaps for characters not used on the current page, or even document, because they were sent for previous pages and may be useful for subsequent pages. If printer memory gets low, it is conceivable to delete individual characters not currently in use from a slot to free up memory if the printer allows this and can usefully use the freed up memory.

When the entire document has been processed, a test is made at 90 to see if any data was drawn into the full page bitmap. If so, the contents of the bitmap are transmitted to the printer as shown at 95. If significant numbers of characters have been processed using fonts sent to the printer, then this data should be much reduced compared with a page containing characters drawn using system fonts processed entirely using previously known methods. If bitmap data is also to be sent to the printer, at 95, fonts which have not been used on the current page can be deleted from the printer if the bitmap data becomes larger.

When the printer has printed the page, the space allocated to bitmaps and other graphical data and any character string data and character position data is removed from the printer's memory. The font data and character definition data remains in the printer's memory available for printing the next page.

At the start of processing each page the printer driver software records the fact that none of the font slots in the printer contain fonts for which characters have been drawn on that page. As characters are drawn, the slots are marked as 'in use' for that page and the fonts in those slots cannot then be deleted to free slots and printer storage for other fonts or to save space in the printer.

When a complete document or job has been printed, all the fonts using slots allocated in the printer for font instances could be deleted from the printer. This means that any new document or job must have all its fonts downloaded again but means that if the printer is turned off (which usually means the soft fonts in the printer are lost) that new jobs print correctly without special system or operator action. In a preferred embodiment, the fonts are left in the printer so that the next job, which could for example be a revision of the previous document printed, does not require the same fonts to be sent to the printer. This is an implementation decision.

It is important to put a limit on the amount of printed storage used for printer character bitmaps using the method described here. This can be done by doing exact calculation of the printer storage used at any given time if this is feasible, or by simpler calculations, for example just by limiting the number of slots used and the size of font processed by this method to a reasonable maximum size.

In the case when there are too many font instances being used on a single page, it is useful to be able to send font instance character bitmaps to the printer as graphics. This can either be when the printer slots run out or because it is more efficient to use bitmaps when a large variety of fonts is being used.

In this case the character bitmap can be copied to the full-page bitmap created by the printer driver software. This full-page bitmap is then processed as described above. This is the normal method for printing characters for scalable fonts prior to this invention.

It is possible to use both approaches together because the computer system uses the same bitmap in both cases. Otherwise using the same characters could produce different appearances in different circumstances.

Figure 2:
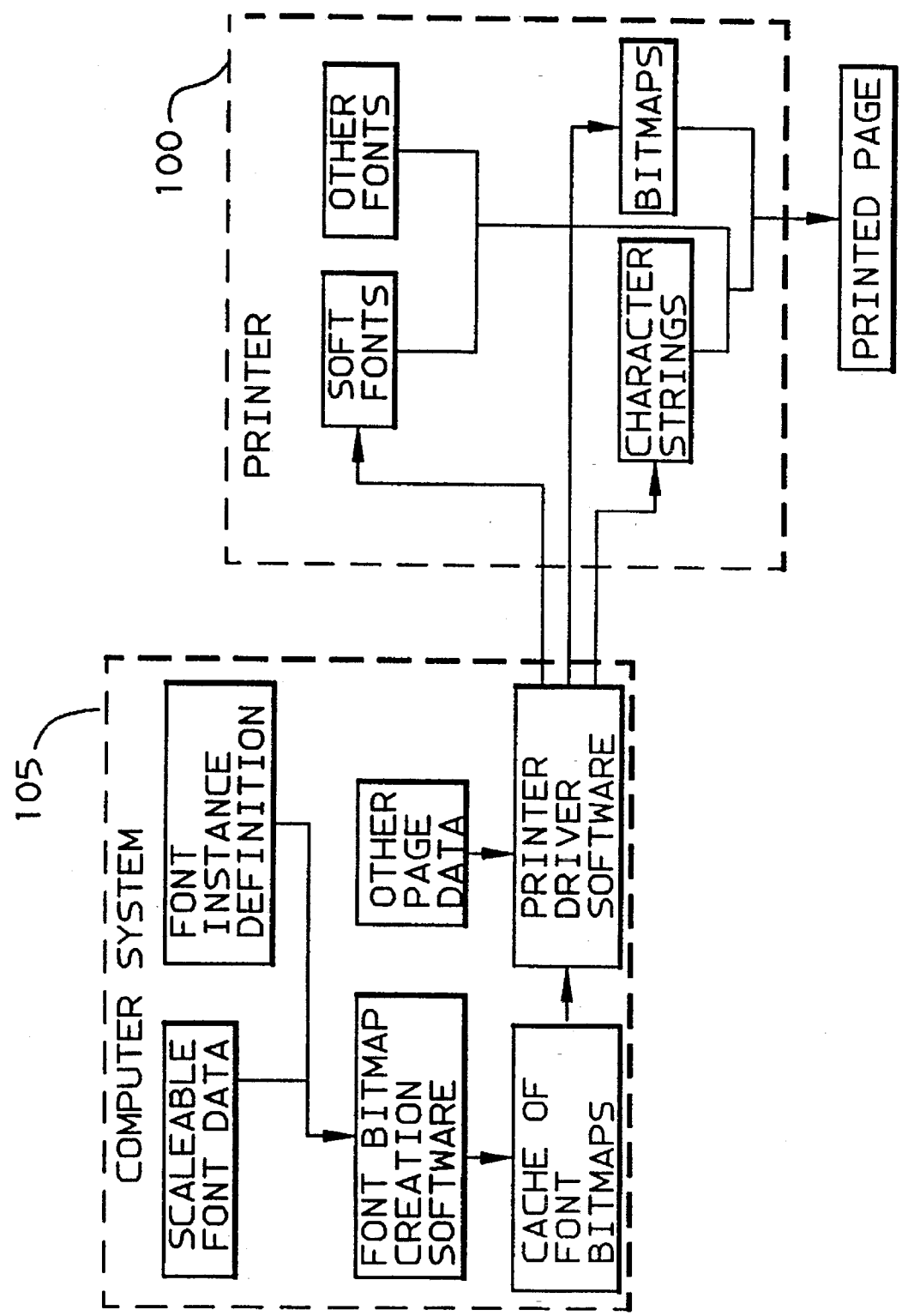
FIG. 2 is a diagram showing various functional areas of a computer system linked to a printer for carrying out printing.

The printer 100 shown in FIG. 2 allows a number of soft fonts to be sent to it and allows the fonts to be deleted by commands from the computer system 105. The printer may also allow the computer system to interleave commands for sending specified font characters to the printer with drawing commands for using characters from that font.

Computer programs running in the computer system which wish to do printing using the printer driver software can select any font instance they wish for the style to be used with the character identifiers to be printed.

I claim:

1. A method of printing a document stored in a data processing system, comprising the steps of:

selecting a document to be printed on a printer linked to the data processing system;

selecting a system font for use in printing at least part of the document;

automatically generating character definition data representing the system font for the part of the document after selecting the document and the printer;

automatically converting the generated character definition data to a format acceptable to the printer as soft font definition data;

automatically transmitting the soft font definition data to the printer; and automatically transmitting character identification data to the printer for printing the part of the document using the soft font definition data.

2. The method of claim 1, wherein:

the transmitted soft font definition data is retained in the printer for subsequent use; and the method further comprises the step of checking if the soft font definition data has been previously transmitted to the printer and is still available on the printer.

3. The method of claim 1, wherein the soft font definition data includes character bitmaps.

4. The method of claim 1, further comprising the step of checking if soft font characters for those characters from the system font needed to print the document have been previously transmitted to the printer.

5. The method of claim 1, further comprising the steps of:

checking for the presence of material not printable by the printer using the soft font definition data; and transmitting the document to the printer as a mixture of extracts from a full-page bitmap and character identification data depending on the presence of material not printable using the soft definition data.

6. The method of claim 2, further comprising the step of, testing to determine if the printer has sufficient free storage to accept the soft font definition data prior to transmitting the soft font definition data to the printer for printing a current page.

7. The method of claim 6, further comprising the step of, deleting previously transmitted soft font definition data stored in the printer and not being used to print the current page prior to transmitting the soft font definition data, depending on the determination of sufficient free storage.

8. The method of claim 6, further comprising the step of, transmitting characters requiring the soft font definition data to the printer as extracts from a full-page bitmap depending on the determination of sufficient free storage.

9. The method as claim in claim 1, wherein the document selected to be printed includes multiple selected system fonts.

10. The method of claim 1, wherein the step of selecting a system font includes selecting a transformation to be applied to the specified system font.

11. The method of claims 2, wherein prior to transmitting extracts or complete full-page bitmap data for printing a current page, further comprising the steps of:

testing to determine if the printer has sufficient free storage to accept the extracts or complete full-page bitmap data, and deleting previously transmitted soft font definition data not being used in printing a current page depending on the determination of sufficiency of free storage.

12. A data processing system having means for printing a document comprising:

means for selecting a document to be printed on a printer linked to the data processing system;

means for selecting a system font for use in printing at least part of the document;

means for automatically generating character definition data representing the system font for the part of the document;

means for automatically converting the generated character definition data to a format acceptable by the printer as soft font definition data;

means for automatically transmitting the soft font definition data to the printer; and means for automatically transmitting character identification data to the printer for printing the part of the document using the soft font definition data.

13. The method of claim 1, further comprising the steps: automatically determining for each page whether it is more efficient to transmit soft font character definitions and character identifications or to transmit a bit map of characters of at least a part of the page as graphics; and automatically downloading soft fonts and character identifications or the characters as graphics for each page depending on the determination of efficiency.

14. A printer comprising:

means for receiving single soft font character definitions interleaved with character identifications;

means for dynamically adding the single character definitions into an existing printer soft font which was previously fully downloaded without adding the entire printer soft font; and means to print soft font characters depending on the single character definitions and character identifications.

15. The printer of claim 14, in which:

means for receiving include, means for receiving graphics interleaved with the single character definitions and character identifications for printing; and means for printing the graphics and characters together on a page.

16. The printer of claim 14, further comprising:

means for deleting single character definitions from an existing soft font without deleting the entire soft font; and means for dynamically allocating memory for soft fonts so that deleting the single character definitions from one soft font frees space which can be used for adding single character definitions to another soft font.

17. The data processing system of claim 12, further comprising:

means for automatically determining whether soft font definition data has been previously transmitted to the printer; and preventing the generation of character definition data, converting of the character definition data to soft font definition data, and transmission of the soft font definition data to the printer depending on the determination of previous transmission.

18. The data processing system of claim 12, further comprising:

means for determining whether the printer has sufficient free storage to accept soft font definition data; and means for each page, for deleting selected characters in a previously downloaded soft font without deleting the entire font, which characters are not required to print the page; and means for adding soft font definition data for selected characters needed to print the page, to a soft font of a previously completed soft font download.

19. The data processing system of claim 12, further comprising:

means for automatically determining for each page whether it is more efficient to transmit soft font character definitions and character identifications or to transmit a bit map of characters of at least a part of the page as graphics; and means for automatically selectively downloading either soft fonts and character identifications or the characters as graphics for each page depending on the determination of efficiency.

* * * * *